Feb. 1, 1966  G. BRIGHAM  3,232,187
ROAD SAFETY EDGE
Filed June 4, 1962
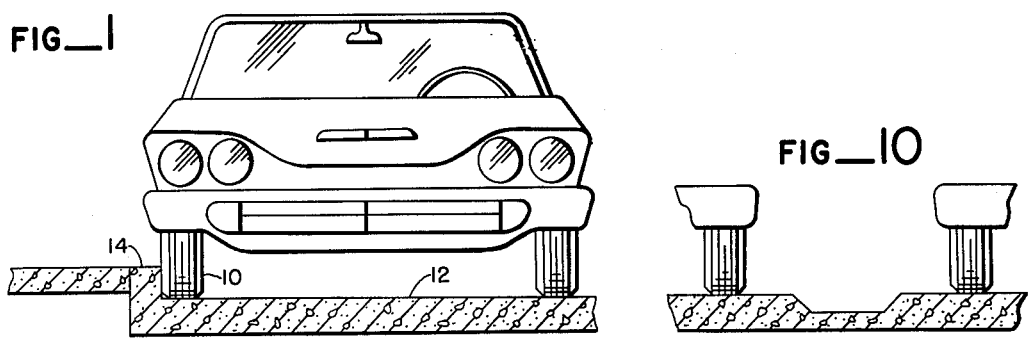
FIG—1
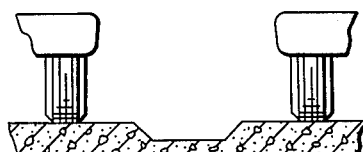
FIG—10
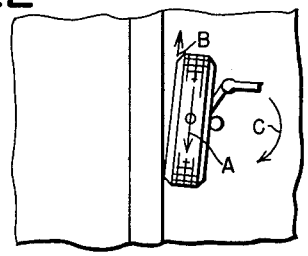
FIG—2
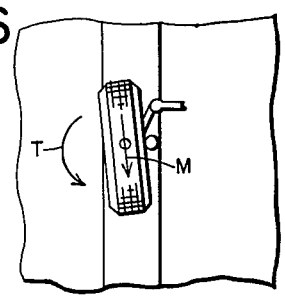
FIG—6
FIG—11
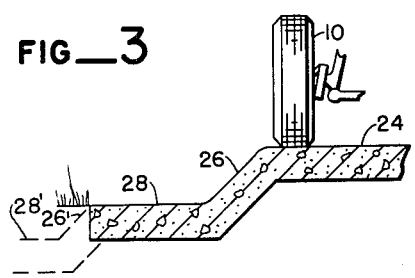
FIG—3
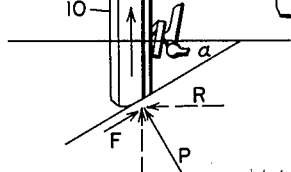
FIG—12
FIG—7
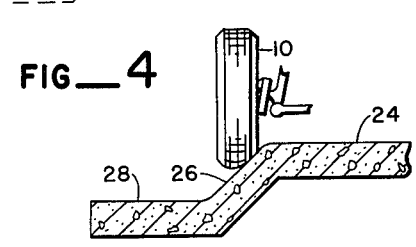
FIG—4
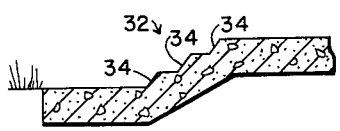
FIG—8
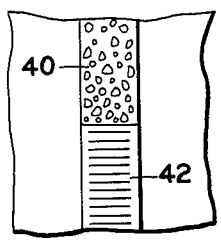
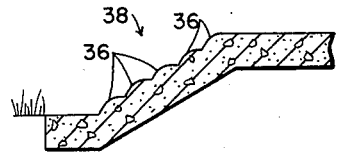
FIG—9
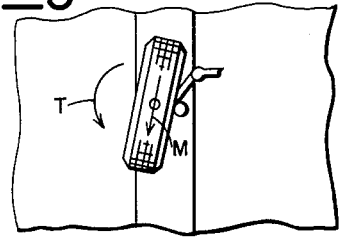
FIG—5
GEORGES BRIGHAM
*INVENTOR.*
BY *Ford S. Smith*

United States Patent Office 3,232,187
Patented Feb. 1, 1966

3,232,187
ROAD SAFETY EDGE
Georges Brigham, 3708 42nd Ave. S., Seattle, Wash.
Filed June 4, 1962, Ser. No. 199,856
10 Claims. (Cl. 94—1.5)

This invention relates to a new and useful concept in the design for a safety edge for roads and highways and more particularly to a road or highway edge which, instead of utilizing a guard barrier or obstacle projecting above the roadway surface, relies upon a depressed edge in combination with the vehicle front (or steering) wheel to employ a gyroscopic effect to prevent the automobile from leaving the roadway.

Automobiles traveling on modern highways and freeways leave the pavement for numerous reasons. The driver may suffer a temporary mental lapse, fall asleep, or even become ill. Automobiles also leave the roadway because of mechanical failures. In most cases it would appear that the car in approaching the road edge moves at a slight angle to said edge. Thus, at least initially, the car leaves the pavement gradually, giving the driver some but not really enough time to recover and right the vehicle.

However, if the edge of the pavement is so designed that it tends to guide or assist the car back toward the roadway proper then the driver will have an opportunity to stop, slow down or right the vehicle and thereby decrease danger to himself and to the automobile. Prior patentees have recognized the need for protecting highway edges but have done so on the theory that a raised guard or barrier is the correct means. Actually raised highway edges increase the danger which they purportedly seek to minimize or eliminate. Of course, it must be recognized that this invention does not offer 100% retention. A car traveling at a large angle to the road edge probably could not have its direction of movement changed sufficiently quickly to return onto the highway. Guard rails and posts, therefore, do have a function even on highways having this safety edge where the highway bank is high or a precipitous drop is close to the road bed.

The need, which arises from the above mentioned reasons for a car's leaving the roadway, is for an edge that will tend to guide the vehicle automatically back to the road surface. Conventional highway design includes comparatively soft shoulders at the edges which are usually level with the road surface. Once a vehicle wheel leaves the pavement and engages the soft shoulder the tendancy is to pull the car further onto the shoulder and then to the surfaces beyond the shoulders. This design, coupled with various reasons for a car's leaving the roadway, cause the continually recurring, and very often serious accidents about which so much is heard and read.

The road edge of this invention comprises essentially a short sloping side surface dropping away from and below the road surface, which levels off away from the pavement for a short distance before terminating. Thus, there is formed a sloping step at each edge of the roadway. The design of this highway edge is based on the demonstrable phenomenon that an automobile tire which contacts a curb tends to climb the curb. From this observable fact comes the conclusion that a surface inclining downwardly and away from the pavement edge is a safety factor and that hitherto patented road edges inclining upwardly and away from the surface are in fact positive hazards because of the tendency of the upward slope to draw the vehicle off the road.

Accordingly it is an object of this invention to provide a road safety edge which is extremely simple in design and easy and economical to construct.

Another object of this invention is to provide a road safety edge which tends to guide or assist a moving vehicle back onto the road surface without presenting an obstacle to the vehicular motion.

Still another object of this invention is to supply a road safety edge which will render it easier to pass through narrow sections of road because of the automatic, or inherent correction, aspect with which this invention is concerned.

Yet an other object of this invention is to furnish a road safety edge which will reduce the need for widening roads as traffic speeds increase, again because of the inherent correction principle.

A further object of this invention is to provide a road safety edge which has the psychological advantage to drivers of eliminating barriers, obstacles, raised inclines and other similar structures which impose a burden on the nerves and emotions.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a front view of an automobile adjacent to a curb;

FIGURE 2 is a diagrammatic plan view of the position of the right front wheel of the vehicle of FIGURE 1;

FIGURE 3 is an elevational diagram of an automobile wheel approaching a road curb at an angle;

FIGURE 4 is an elevational diagram of the auto wheel moving at a slight angle down the road safety edge incline;

FIGURE 5 is a plan diagram of a wheel in the position shown in FIGURE 4;

FIGURE 6 is a plan diagram showing the wheel turned to move at a slight angle up the incline;

FIGURE 7 shows a variable angle slope as an alternative form of this invention;

FIGURE 8 shows a slope defined by a series of short steps as an alternative form;

FIGURE 9 shows a series of rounded ridges defining a sloping edge which is an alternative embodiment;

FIGURE 10 shows the manner in which the center section of a highway would be designed; and FIGURE 11 is a diagrammatic representation of the theory of forces upon which the explanation for this invention is based.

FIGURE 12 is a plan view of the road safety edge showing further means by which friction can be minimized.

FIGURES 1 and 2 illustrate the danger which this invention will guard against. A moving vehicle has a wheel 10 on roadway 12 adjacent to curb 14. An automobile moving along a curb will, if the tire 10 is touching the curb 14, tend to climb the curb, even if the tire is parallel, but especially if the front of the tire is angled slightly toward said curb.

The reasons why an automobile wheel will tend to climb the curb are as follows: nearly at rest or at slow speed, a rearward acting frictional force develops on the tire touching the curb. For instance, forward motion of the wheel 10 in the direction of arrow A, while said wheel is in contact with curb 14, produces a rearward frictional force, generally shown by arrow B. Such friction force produces a torque about a center of moments which, for the purpose of this simplified discussion, will be considered to be centered at the king pin. Such torque, illustrated by arrow C, acts to force the front of the wheel against the curb and in fact, to cause the wheel to climb said curb.

The explanation for the tendency of an automobile wheel to climb an inclined surface at moving speeds and even more so, at high speed, is advanced on the gyroscopic principle. FIGURE 11 is a simplified diagram showing the basic forces involved. A wheel, rotating so that the tire surface 10 in FIGURE 11 is moving upwards (hence the wheel is traveling away from the observer) subjected to a force R, acts like a gyroscope and will rotate so as to climb the inclined surface, as is shown in any textbook on mechanics.

Wheel 10 approaches the road edge (FIGURE 3) then travels over the edge line and onto edge surface tire, as opposed to the running surface or tread, contacts the inclined edge surface 26 the torque effect previously discussed begins to take effect. Arrow M designates the forward motion of the tire. Torque designated as arrow T, forces the front of the wheel in the direction of the roadway to guide the automobile in a safe direction (FIGURE 6). This phenomenon is demonstrated by the tendency of car tires to track on raised street car rails or raised joints in roadway surfaces.

A wheel, the axis of which makes an angle $a$ with the inclined surface on which the wheel is riding is supported by two forces. One force P is perpendicular to the surface, the other, F, is parallel to the surface and due to friction. If the coefficient of friction between the wheel and road is C, then F may be as large as CP. F and P may be represented by two equivalent forces, a vertical one, W, and a horizontal one R. W is equal to the weight of the wheel and part of the car. By elementary mechanics:

$$W = P \cos a + F \sin a = P(\cos a + C \sin a)$$

and $$R = P \sin a - F \cos a = P(\sin a - C \cos a)$$

$$\therefore R = W \frac{\sin a - C \cos a}{\cos a + C \sin a}$$

R, then will be greater than 0 if $(\sin a - c \cos a)$ is greater than 0 or equivalently if $a$ is greater than arctangent C.

Thus, to obtain a lateral force on the wheel, R, the friction between wheel and inclined surface must be made as small as possible, and the angle of inclination greater than arctangent C. On the other hand, the angle of inclination must not be too great or the wheel will drop off the road surface too quickly.

The force actually turning the wheel back up the incline may be termed a redressing effect. The strength and duration of the redressing effect are dependent upon a number of variables but generally it can be concluded that the angle $a$ of the inclined edge must be large enough as previously shown to overcome the frictional effect. For a given height of edge a steeper angle has a stronger redressing effect but for a reduced time—because of reduced width. At higher speeds the redressing is stronger and hence faster, therefore compensating for such greater speeds. Obviously the safety edge of this invention will operate at low as well as high speeds.

The need for as low a coefficient of friction as possible indicates the need for making the inclined edge as slippery as possible. Thus, the incline should be finished to present a slick, glassy surface.

FIGURES 3 to 6 are directed to the safety edge of this invention. It will be seen that the roadway 24 has a downwardly and outwardly sloping edge surface 26 which joins a generally flat or level portion 28 below the roadway 24. Edge surface 26 is inclined for a specific reason. Obviously, if the edge surface is vertical the wheel 10 could lose contact with very little sideways movement. Thus, the result would be an instantaneous loss of redressing effect. With the edge surface inclined the wheel must necessarily move a greater distance normal to the roadway direction, allowing the torque effect to be exerted for sufficient time to cause the wheel to right itself back toward the roadway. As the angle becomes greater, as measured from the horizontal, then the wheel is able to leave the inclined surface more quickly, but the redressing effect is stronger.

Vertical height between the roadway edge and the level side portion 28 might be generally in the area of half a foot. The crest of edge surface 26 need not be sharp or rounded. However, a sharp crest would be subject to chipping and nicking from highly concentrated loads such as would result from truck tires and the like. As a practical matter the crest should be rounded though the radius of curvature is not critical. The crest configuration then becomes a practical construction question. The configuration, like the crest, is a design problem to be determined by factors collateral to this discussion.

It is contemplated, of course, that more than one inclined surface could be provided. Thus, there could be two or three said inclined surfaces, separated from each other by level areas corresponding to level side portion 28. Thus, a second inclined edge surface 26' joined to a second level portion 28' (shown in dotted lines in FIGURE 3) may be provided.

The inclined edge 26 must be of such dimensions that the undercarriages of automobiles which leave the roadway to travel on the incline will not contact, scrape or hang up on the crest of the incline. Such factor is the primary reason for limiting the extent of vertical drop of the inclined surface 26. This road safety edge is constructed of the same material as the roadway proper, as for instance of conventional cement or asphaltic concrete. It will be apparent that such road safety edge can be constructed as part of a new roadway or added to existing roads. The cost of the installation is small and such a road safety edge lends itself very suitably to good drainage.

FIGURE 10 indicates how the center of a roadway should be designed. Instead of raised channeling down the center to divide the roadway, a depression with an inclined edge should be employed. The bottom of the depression should be wider than a vehicle tire, of course, so that the tire cannot grip both inclines simultaneously.

FIGURES 7 to 9 illustrate other forms which this surface might assume.

In any one of the alternative embodiments, the tendency to turn the wheel up the incline is the same. FIGURE 7 shows a rounded or variable angle slope 30. FIGURE 8 illustrates a series of small steps 34 forming the general incline 32. FIGURE 9, similar to FIGURE 8, teaches a series of rounded slopes 36 comprising general sloping surface 38. The low coefficient of friction again must be kept in mind in the alternative road safety edge structure. In FIGURE 8 it only is essential that the step slopes 34 be finished to present as slick or smooth a surface as possible. The embodiments in FIGURES 7 and 9 should be smooth from top to bottom.

FIGURE 12 illustrates another feature by which the frictional contact between a tire and the safety edge may be minimized. The surface of the safety edge or slope 26 is slicked, finished or smoothed to the extend possible except that said finished surface is broken up by raised or depressed spots 40 or by grooves and ridges 42. As most motorists know when a car travels over a series of ridges and grooves or patches of small raised and depressed spots the tires will tend to lose traction. This reduction in friction between the front or directing wheel and the road, when it rides on the safety edge, increases the redressing force F acting on the gyroscope and hence increases the redressing effect. Therefore, this lends itself to enhancing the desired effect. The ridges and grooves may be interspersed with raised or lowered spots in a random manner or one or the other may be used without the other.

The foregoing is considered as illustrative only of the principle of this invention. Since numerous modifications and changes will readily occur to those skilled in the art, it is not desired to limit the invention to the exact construction and operation shown and described, and

What is claimed is:
1. A safety edge for roadways constructed of concrete and asphaltic materials, comprising: an inclined surface located at the edge of said roadway, said inclined surface merging with the roadway edge and sloping downwardly and away from said edge at such an angle as to allow a vehicle tire to contact and ride on said surface, said inclined surface being finished and having a minimum coefficient of friction with tires riding thereon; said inclined surface having an angle of incline from the horizontal greater than the arctangent of said coefficient of friction; and a substantially level portion joined to the bottom of said inclined surface, the vertical distance between said crest and said level portion being such as to prevent contact of an automobile under carriage on said crest, when one wheel is one said level portion and its opposed wheel is on said roadway.

2. The safety edge for roadways according to the structure of claim 1 and in which said inclined surface is substantially straight.

3. The safety edge for roadways according to the structure of claim 1 and in which said inclined surface is a rounded, variable-angle surface.

4. The safety edge for roadways according to the structure of claim 1 and in which said inclined surface is a series of small step portions having generally horizontal top surfaces and generally inclined side surfaces.

5. The safety edge for roadways according to the structure of claim 1 and in which said inclined surface is a series of generally rounded slopes.

6. A safety edge for roadways constructed of concrete and asphaltic materials, comprising: an inclined surface located at the edge of said roadway, the crest of said inclined surface merging with the edge of said roadway and being made of same material as said roadway, said inclined surface also being finished and having a minimal coefficient of friction so as to produce minimum friction between said inclined surface and vehicular tires passing thereover; said inclined surface having an angle of incline from the horizontal of between about 30° to about 60°; and a substantially level portion joined to the bottom of said inclined surface and being constructed of the same material as said roadway and said inclined surface, the vertical distance between said crest and said level portion being such as to prevent contact of an automobile under carriage on said crest, when one wheel is on said level portion and its opposed wheel is on said roadway.

7. The safety edge for roadways according to the structure of claim 6 and in which said inclined surface is substantially straight.

8. The safety edge for roadways according to the structure of claim 6 and in which said inclined surface is a rounded, variable-angle surface.

9. The safety edge for roadways according to the structure of claim 6 and in which said inclined surface is a series of small step portions having generally horizontal top surfaces and generally inclined side surfaces.

10. The safety edge for roadways according to the structure of claim 6 and in which said inclined surface is a series of generally rounded slopes.

References Cited by the Examiner
UNITED STATES PATENTS

| | | | |
|---|---|---|---|
| 775,791 | 11/1904 | Austin | 94—31 |
| 899,252 | 9/1908 | Hackney | 238—5 |
| 1,067,501 | 7/1913 | Brown | 94—31 X |
| 1,316,182 | 9/1919 | Pitman | 238—5 |
| 1,637,998 | 8/1927 | Heltzel | 94—31 X |
| 1,827,886 | 10/1931 | Gillespie | 104—37 |
| 1,849,421 | 3/1932 | Dyer | 94—31 |
| 1,909,551 | 5/1933 | Ross | 94—32 |
| 2,078,864 | 4/1937 | Macatee | 94—31 |
| 2,405,335 | 8/1946 | Turner | 94—31 X |
| 2,994,255 | 8/1961 | Trief et al. | 94—1.5 X |

CHARLES E. O'CONNELL, *Primary Examiner.*

JACOB NACKENOFF, *Examiner.*